A. F. PFLUGHAUPT, Jr.
Device for Preventing the Entrance of Sewer Gas into Buildings.
No. 228,927. Patented June 15, 1880.
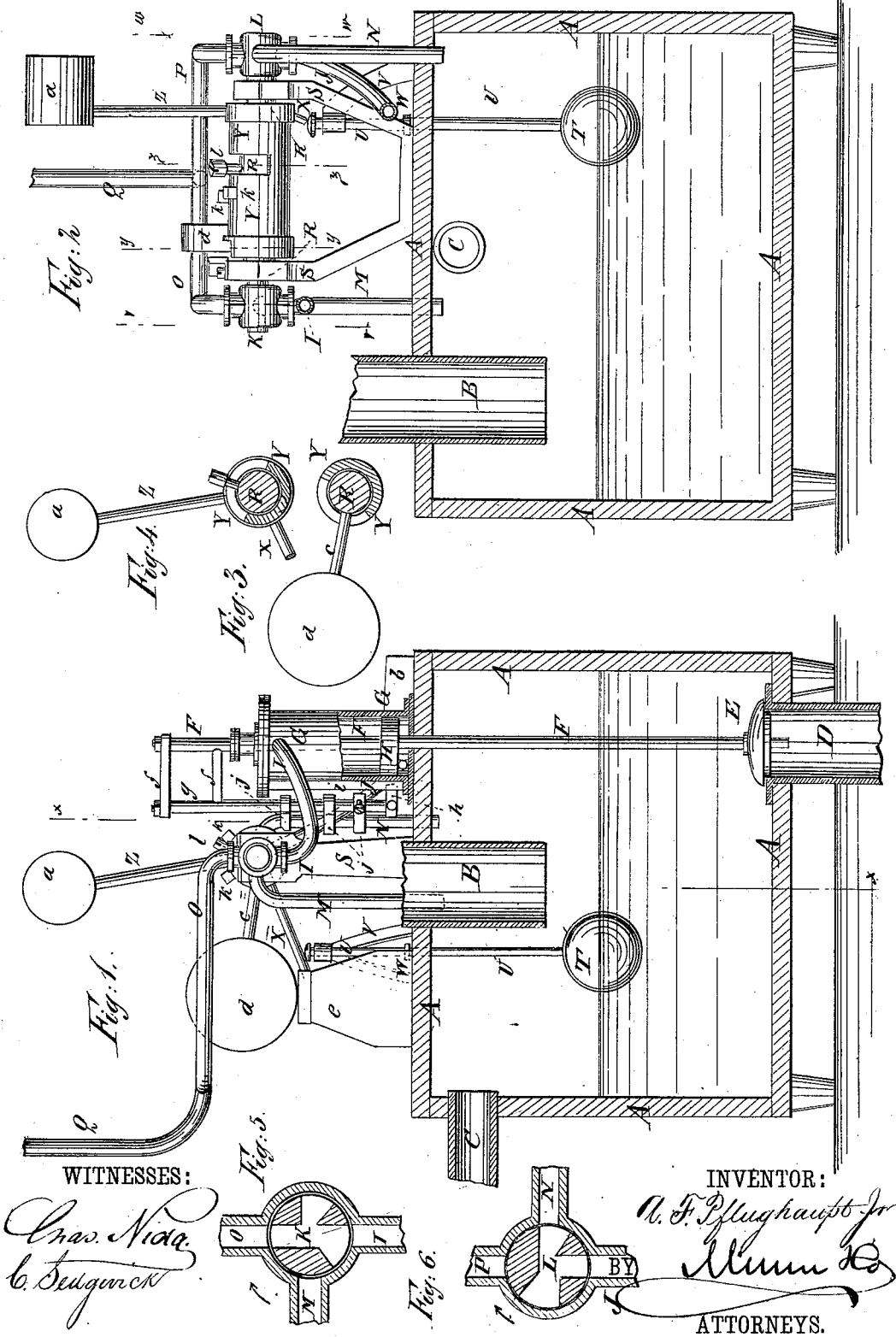
WITNESSES:
INVENTOR:
A. F. Pflughaupt Jr.
BY
ATTORNEYS.

UNITED STATES PATENT OFFICE.

ALBERT F. PFLUGHAUPT, JR., OF BROOKLYN, NEW YORK.

DEVICE FOR PREVENTING THE ENTRANCE OF SEWER-GAS INTO BUILDINGS.

SPECIFICATION forming part of Letters Patent No. 228,927, dated June 15, 1880.

Application filed December 9, 1879.

*To all whom it may concern:*

Be it known that I, ALBERT F. PFLUGHAUPT, Jr., of Brooklyn, in the county of Kings and State of New York, have invented a new and useful Improvement in Devices for Preventing the Entrance of Sewer-Gas into Buildings, of which the following is a specification.

Figure 1 is a sectional elevation of the improvement. Fig. 2 is a sectional elevation taken through the line $x\,x$, Fig. 1. Fig. 3 is a sectional elevation taken through the line $y\,y$, Fig. 2. Fig. 4 is a sectional elevation taken through the line $z\,z$, Fig. 2. Fig. 5 is a sectional elevation taken through the line $v\,v$, Fig. 2. Fig. 6 is a sectional elevation taken through the line $w\,w$, Fig. 2.

Similar letters of reference indicate corresponding parts.

The object of this invention is to furnish devices for preventing the entrance of sewer-gas into buildings, so constructed as to operate automatically to discharge the sewage into the sewer.

The invention consists in the combination, with a tank interposed between the waste-pipe and sewer, and provided with a discharge-valve connected with the piston of a cylinder, into the opposite ends of which water is admitted alternately through two three-way cocks, of devices by which the three-way cocks are operated to admit and shut off the water by the rise of the sewage in the tank and the movement of the piston, as will be hereinafter fully described.

A represents a close iron tank interposed between the waste-pipe B and the sewer, and into which everything passing through the waste-pipe is discharged. The lower end of the waste-pipe B should never extend so low as to reach the contents of the tank A. The waste-pipe B should be as nearly vertical as possible, and without any traps, and should pass up through the roof of the building.

With the upper part of the tank A is connected the inner end of the pipe C. The pipe C is open at both ends, and its upper end should be at or near the surface of the ground, so that the warm air from the tank A may pass up through the waste-pipe B and may be replaced by fresh air through the air-pipe C. In the bottom of the tank A is formed an outlet, D, leading to the sewer, and which is closed at its upper end by a valve, E. The stem F of the valve E passes up through the top of the tank A and through both ends or heads of the cylinder G, which is secured to the top of the tank A or to some other suitable support.

To the stem F within the cylinder G, and in such a position as to be close to the lower end of the said cylinder G when the valve E is closed, is attached a piston, H, which works water-tight in the said cylinder G. With the upper and lower parts of the cylinder G are connected the ends of two pipes, I J, so that the piston H may be moved down and up to close and open the valve E by water-pressure. The other ends of the pipes I J are connected with the three-way cocks K L. With the second outlets of the three-way cocks K L are connected two pipes, M N, leading down into the tank A, to discharge the waste water into the said tank A. The third outlets of the three-way cocks K L are connected with the branch pipes O P, leading to the water-pipe Q.

The three-way cocks K L are attached to the ends of a shaft, R, so that they will always move together, and are so arranged that when one is adjusted to allow the water to pass from the pipe Q into one end of the cylinder G the other will be adjusted to allow the water to flow from the other end of the said cylinder G into the tank A. The shaft R works in bearings in supports S, attached to the tank A.

In the upper part of the tank A is placed a spherical or other shaped float, T, the stem U of which passes up through a hole in the top of the tank A, and in a bracket, V, attached to the said tank. The movement of the float T is limited by a collar, W, formed upon or attached to the stem U. Upon the upper end or head of the float-stem U rests the end of an arm, X, the other end of which is attached to the sleeve Y, placed upon the middle part of the shaft R.

To the sleeve Y is attached the end of a second arm, Z, to the outer end of which is attached a weight, *a*. The arms X Z should stand at such an angle with each other that when the end of the arm X rests upon the end of the float-stem U the weight $a$ will be upon that side of the sleeve Y, so as to hold the arm X and sleeve Y securely in place. As the float T rises in the tank A the stem U raises the arm X and turns the sleeve Y, carrying the weight $a$ to the other side of the sleeve Y, so that the weight $a$ will drop to a stop, $b$, attached to the tank A.

To the shaft R is attached an arm, $c$, to the outer end of which is attached a weight, $d$. The arm $c$ passes through a slot in the sleeve Y, so that the shaft R may be turned to adjust the three-way cocks K L by the movements of the sleeve Y. When the arm X rests upon the float-stem U the weight $d$ rests upon a stop, $e$, attached to the tank A.

The stops $b$ $e$ should be formed of or cushioned with rubber or other suitable material, to prevent jar and noise when the weights $a$ $d$ come in contact with them.

The slot in the sleeve Y, through which the arm $c$ passes, should be of such a length and so arranged that when the sleeve Y is turned by the rise of the float T the weight $a$ will be carried so far past a vertical position that its gravity will be sufficient to raise the weight $d$ and shift the three-way cocks.

The three-way cocks are so arranged that when the arm X rests upon the float-stem U and the weight $d$ upon the stop $e$ the cock K will be in position to allow the water to pass through the pipes O I to the upper part of the cylinder G and hold the valve E down to its seat by water-pressure and the cock L in position to allow the water from the lower part of the cylinder G to flow through the pipes J N into the tank A. When the cocks K L have been shifted by the rise of the float T the cocks L K will be in position to allow the water to flow through the pipes P J into the lower part of the cylinder G and the water in the upper part of the said cylinder G to escape through the pipes I M into the tank A, opening the valve E by water-pressure and allowing the contents of the tank A to flow through the outlet D into the sewer.

To the upwardly-projecting part of the piston-rod F are attached two arms, $f$, of a length a little greater than the length of a radius of the cylinder G.

To the outer ends of the arms $f$ is attached a vertical rod, $g$, to the lower end of which is attached a guide, $h$, to move up and down in a groove or way, $i$, attached to the side of the cylinder G to keep the rod $g$ in a vertical position.

Upon the rod $g$ are placed three tappets, $j$, which are secured in place adjustably by set-screws. As the piston H moves upward, the two upper tappets, $j$, strike successively two lugs or pins, $k$, attached to or formed upon the sleeve Y, so as to turn the sleeve Y and bring the arm X and weight $a$ back to their former position. As the piston H nearly completes its upward stroke the third or lowest tappet, $j$, strikes a pin, $l$, attached to the cock-shaft R, and which projects through a slot in the sleeve Y, and turns the said shaft R and adjusts the three-way cocks K L to their former position, again admitting the water to the upper part of the cylinder G and closing the valve E. The apparatus is thus automatic in its operation.

To prevent the water from being shut off from the lower part of the cylinder G before the lowest tappet, $j$, has carried the weight $d$ past a vertical position, the holes in the plugs of the cocks K L are extended upon one side, as shown in Figs. 5 and 6, the remaining part of the movement of the cock-plugs being completed by the gravity of the weight $d$.

Having thus described my invention, I claim as new and desire to secure by Letters Patent—

1. In a device for preventing the entrance of sewer-gas into buildings, the combination, with the tank A and the shaft R, connecting the two three-way cocks K L, of the float T, provided with the stem U, and the sleeve Y, provided with the arm X and the weighted arm Z $a$, substantially as herein shown and described, so that the sleeve Y will be turned by the rise of the float T, as set forth.

2. In a device for preventing the entrance of sewer-gas into buildings, the combination, with the shaft R, that connects the two three-way cocks K L, and the sleeve Y, provided with the arm X and the weighted arm Z $a$, of the weighted arm $c$ $d$, substantially as herein shown and described, so that the shaft R may be turned to operate the three-way cocks K L by the movement of the sleeve Y, as set forth.

3. In a device for preventing the entrance of sewer-gas into buildings, the combination, with the piston-rod F, the shaft R, connecting the three-way cocks K L, and the sleeve Y, of the rod $g$, provided with the tappets $j$ and the pins or lugs $k$ $l$, attached to the sleeve Y and shaft R, substantially as herein shown and described, so that the sleeve Y and shaft R may be turned to reverse the three-way cocks K L by the upward movement of the piston-rod F, as set forth.

ALBERT F. PFLUGHAUPT, Jr.

Witnesses:
    JAMES T. GRAHAM,
    C. SEDGWICK.